(12) United States Patent
Liu et al.

(10) Patent No.: US 10,273,398 B2
(45) Date of Patent: Apr. 30, 2019

(54) ENCAPSULATED INTERNAL FILTER CAKE BREAKERS WITH IMPROVED RELEASE PROPERTIES

(71) Applicants: Dow Global Technologies LLC, Midland, MI (US); Rohm and Haas Company, Philadephia, PA (US)

(72) Inventors: Chun Liu, Midland, MI (US); Carol E. Mohler, Midland, MI (US); Theodore Tysak, Ambler, PA (US); Paul Mercando, Pennsburg, PA (US); Kacee B. Ender, Missouri City, TX (US); Disha Jain, Houston, TX (US)

(73) Assignees: Dow Global Technologies LLC, Midland, MI (US); Rohm and Haas Company

( * ) Notice: Subject to any disclaimer, the term of this patent is extended or adjusted under 35 U.S.C. 154(b) by 526 days.

(21) Appl. No.: 14/893,576

(22) PCT Filed: Jul. 31, 2014

(86) PCT No.: PCT/US2014/049083
§ 371 (c)(1),
(2) Date: Nov. 24, 2015

(87) PCT Pub. No.: WO2015/017633
PCT Pub. Date: Feb. 5, 2015

(65) Prior Publication Data
US 2016/0130497 A1    May 12, 2016

Related U.S. Application Data

(60) Provisional application No. 61/861,628, filed on Aug. 2, 2013.

(51) Int. Cl.
*E21B 43/16* (2006.01)
*C09K 8/536* (2006.01)
*C09K 8/03* (2006.01)
*C09K 8/516* (2006.01)
*E21B 37/00* (2006.01)

(52) U.S. Cl.
CPC ............... *C09K 8/536* (2013.01); *C09K 8/03* (2013.01); *C09K 8/516* (2013.01); *E21B 37/00* (2013.01); *C09K 2208/26* (2013.01)

(58) Field of Classification Search
CPC .. C09K 8/68; C09K 2208/30; C09K 2208/26; C09K 8/74; C09K 8/506; C09K 8/52; C09K 8/516; C09K 8/536; C09K 8/706; E21B 43/267; E21B 43/26; E21B 37/00; E21B 43/04; E21B 21/00; E21B 37/06; E21B 33/138; E21B 33/13; E21B 43/16; E21B 43/25
See application file for complete search history.

(56) References Cited

U.S. PATENT DOCUMENTS

| | | | |
|---|---|---|---|
| 4,289,671 A * | 9/1981 | Hernandez | C09D 125/08 524/275 |
| 5,238,065 A | 8/1993 | Mondshine et al. | |
| 5,251,697 A | 10/1993 | Shuler | |
| 5,607,905 A | 3/1997 | Dobson, Jr. et al. | |
| 6,861,394 B2 | 3/2005 | Ballard et al. | |
| 2005/0080176 A1 * | 4/2005 | Robb | C09K 8/512 524/424 |
| 2005/0103496 A1 * | 5/2005 | Todd | C09K 8/52 166/278 |

* cited by examiner

Primary Examiner — Zakiya W Bates (57) ABSTRACT

A wellbore fluid including a peroxide degradable polymer and an encapsulated peroxide source. The peroxide degradable polymer may be a polysaccharide. The peroxide source may include an inorganic peroxide, including zinc and alkaline earth metal peroxides, such as magnesium peroxide. The encapsulating material may be a polymer, including a metal crosslinked acrylic polymer. The release of peroxide, from peroxide sources generally, can be controlled by means of pH such that peroxide source can be activated, and peroxide released, by a change in pH. In a wellbore, this pH change can be effected by using produced fluids to lower the pH of a more basic wellbore fluid.

12 Claims, 4 Drawing Sheets

Example 3 Premature Release

Example 3 Triggered Release

FIG 4

Example 4 Premature Release

Example 4 Triggered Release

FIG 5

Example 5 Premature Release

Example 5 Triggered Release

FIG 6

Example 6 Premature Release

Example 6 Triggered Release

FIG 7

Example 7 Premature Release

Example 7 Triggered Release

ENCAPSULATED INTERNAL FILTER CAKE BREAKERS WITH IMPROVED RELEASE PROPERTIES

FIELD OF THE INVENTION

The present invention relates to a composition and method of use thereof for an encapsulated internal filter cake breaker with improved release properties, in particular lower premature release. Said encapsulated internal filter cake breaker comprises an encapsulated internal breaker, preferably a peroxide source and a film comprising a metal-crosslinked acrylic.

BACKGROUND OF THE INVENTION

During the creation and subsequent operation of a subterranean well, the operator may wish to perform acts that could potentially damage the underground formations and their ability to produce desirable formation fluids. For example, the operator may wish to inject water into the well. The operator may do this to enhance the productivity of a well or to dispose of waste water.

In addition to water, other fluids are routinely used in the operation of a subterranean well. Drilling fluids are used to aid in the drilling of a well; both to cool the drill bit and to remove drill cuttings from the well. Completion fluids are used when completion operations are performed in a producing formation. During these processes, it may be desirable to seal off producing formations in order to prevent fluid loss from the well to the formation and to prevent possible damage to the formation.

One way of protecting the formation is by forming a filter cake on the surface of the subterranean formation. Filter cakes are formed when particles suspended in a wellbore fluid coat or plug the pores in the subterranean formation such that fluid is substantially prevented from passing between the formation and the wellbore and vice versa. A number of ways of forming filter cakes are known in the art, including the use of both clay and non-clay based drilling fluids.

In addition to the intentional formation of filter cakes, filter cakes can also be produced unintentionally. For instance, when drilling the well, the particles contained in the drilling mud can lodge in the pores of a formation that the operator desires to bring into production.

Whether the formation of the filter cake was unintentional and intentional, it is desirable to be able to remove the filter cake when the formation is brought into production. The presence of the filter cake can hinder the passage of fluid from the formation to the wellbore and thereby retard production rates.

Various ways have been developed by those skilled in the art to form filter cakes that can be easily removed. For example U.S. Pat. No. 5,251,697 discloses the addition of calcium carbonate to water being injected into a well. The calcium carbonate particles either clog the pores in the subterranean rock formations or collect and build a filter cake. When the filter cake is to be removed, the '697 patent directs the operator to circulate an acid wash, preferably hydrochloric acid, into the well. The acid wash will dissolve the calcium carbonate and thereby destroy the filter cake. At this point the well can be brought into production or additional work performed on the well.

In U.S. Pat. No. 5,607,905 is disclosed a method of forming a filter cake using a fluid containing polysaccharide polymers, bridging particles and an alkaline earth metal or zinc peroxide. The method of the '905 patent seeks to have to particles in the fluid bridge over the formation pores rather than plug the holes. The polysaccharide polymers are typically added to the wellbore fluid as viscosifiers or fluid loss control additives. An earlier patent, U.S. Pat. No. 5,238,065, taught that filter cakes containing polysaccharide polymers could be removed by contacting the filter cake with a brine fluid containing a zinc or alkaline earth metal peroxide, an acidic substance such that the pH of the solution was between 1 and 8 and an activator for the peroxide. A wash solution would then be used to remove the filter cake. The degrading substance incorporated within the filter cake is generally referred to as an internal breaker. The use of an internal breaker was beneficial because it required less peroxide, less loss of wash fluid to the formation, and gave more complete removal of the filter cake.

However, these systems contain several drawbacks. First, the peroxides used have a tendency to emit peroxide prior to activation, resulting in premature weakening of the filter cake as well as reducing the effectiveness of the polymers used to control fluid loss and viscosity. Additionally, these prior art methods require action on the part of the operator to remove the filter cake. This results in additional cost and delay. Also, the acid or other solutions used to dissolve filter cakes can have a harmful effect on the formation. Encapsulation of the peroxide breakers, as disclosed in U.S. Pat. No. 6,861,394, was introduced to provide improve performance regarding delayed release of the peroxide breaker payload. Peroxide sources were coated with a polymer such as a non-crosslinked acrylic acid polymer. However, there remain several problems related to using encapsulated breakers in hydraulic fracturing treatments. Known encapsulation materials are limited to lower down hole temperatures which leads to early release of the peroxides. Further, known encapsulation materials are prone to swelling in moderate basic conditions which also results in premature release of the peroxides.

It would be desirable to provide an improved delayed filter cake breaker with less premature release for use in removing filter cakes in subterranean wells and formations wherein said delayed filter cake breaker demonstrates improved temperature stability and lower permeability and less prone to swelling in moderate basic solutions.

SUMMARY OF THE INVENTION

The present invention is such an improved delayed filter cake breaker with less premature release for use in removing filter cakes in subterranean wells and formations.

One embodiment of the present invention is an encapsulated internal breaker for enhancing the removal of a filter cake from a wellbore in a subterranean formation comprising: i a filter cake breaker, preferably an acid generating compound, an enzyme, an oxidizer, a bromate, an azo compounds, or a combination thereof, and most preferably magnesium peroxide, zinc peroxide, or an alkaline earth metal peroxide, ii an anti-caking agent, preferably magnesium carbonate, calcium carbonate, colloidal silica micro particles, or clay particles, iii an encapsulation film comprising a metal-crosslinked acrylic polymer, preferably a transition metal cross-linked acrylic polymer, more preferably a zinc cross-linked acrylic polymer, said metal cross-linked polymer which is substantially insoluble in well bore fluids having a pH value equal to or greater than 7.5, preferably said film having a Tg greater than 45° C., and iv optionally a water-soluble polymer as a binder, preferably when present in an amount of from 1 to 5 weight percent based on the total weight of the encapsulated internal breaker.

Another embodiment of the present invention is wellbore fluid comprising a degradable polymer and the encapsulated internal breaker disclosed herein above.

Another embodiment of the present invention is a process for enhancing the removal of a filter cake from a wellbore in a subterranean formation comprising the steps: a adding one or more degradable polymer to a wellbore fluid; b adding an encapsulated internal breaker to a wellbore fluid; c pumping said wellbore fluids into the wellbore; and d changing the pH of the fluid in the wellbore so as to activate the degradable polymer; wherein the encapsulated internal breaker is described herein above.

DETAILED DESCRIPTION OF THE INVENTION

The processes, methods and compositions described in this disclosure may be used to form an easily removed filter cake in a subterranean well. The filter cake may be formed by adding various components to a wellbore fluid, pumping the fluid into the wellbore and allowing the fluid to contact the desired subterranean formation.

The wellbore fluid may have a variety of compositions, the appropriate components of which can be selected by one skilled in the art. Preferably, the wellbore fluids are alkaline water based wellbore fluids. The pH of these solutions is preferably between about 7 to about 12, even more preferably between about 7.5 to about 10.5. The pH can be adjusted by methods known to those skilled in the art, including the addition of bases to the fluid. Such bases include potassium hydroxide, sodium hydroxide, magnesium oxide, calcium hydroxide and zinc oxide. These aqueous fluids are generally brine solutions. Such fluids can be natural brine solutions, seawater or brines formed by dissolving suitable salts in water. Suitable salts include chloride, bromide, acetate and formate salts of potassium, sodium, calcium, magnesium, zinc and cesium.

A variety of components may be added to the wellbore fluid to achieve different desired properties, as would be known to those skilled in the art. For example, the wellbore fluid may include viscosifiers, such as polysaccharides or polysaccharide derivatives. Some representative polymers are discussed in U.S. Pat. No. 4,846,981 and the references cited therein, all of which are hereby incorporated by reference.

It may also be desirable to add components to the wellbore fluid to help control fluid loss. Fluid loss additives keep wellbore fluids from entering the subterranean formations while allowing the wellbore fluid to be maintained at a pressure greater than that of the formation. This pressure overbalance acts to keep the formation fluids from entering the wellbore. A variety of materials have been used to control fluid loss, some of which are described in U.S. Pat. Nos. 5,354,786; 4,387,769 and 4,836,940. In particular, various polymers have been used to control fluid loss, including polysaccharides.

Wellbore fluids of the present invention preferably contain polysaccharide polymers for incorporation into a filter cake. Preferred polysaccharide polymers include starch derivatives, cellulose derivatives, and biopolymers, such as: hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum and schleroglucan gum.

Various types of solids can be suspended in wellbore fluids to bridge or block the pores of a subterranean formation. Such solids include those described U.S. Pat. Nos. 4,561,985; 3,872,018; and 3,785,438, which are hereby incorporated by reference. For the purposes of the present invention, of particular interest are those solids soluble in acid solutions. Representative acid soluble bridging solids are calcium carbonate, limestone, marble, dolomite, iron carbonate and zinc oxide. However, other solids may be used without departing from the scope the present invention. Other representative solids include water soluble and oil soluble solids as described in U.S. Pat. No. 5,783,527.

The wellbore fluids of the present invention include a wellbore fluid that contains a filter cake breaker. Filter cake breakers useful in the treatment fluids and methods of the present invention may include, but are not limited to, acid generating compounds, enzymes, oxidizers, bromates (such as sodium bromate and potassium bromate), azo compounds, and any combination thereof. As used herein, the term "acid generating compound" refers to a composition that generates acid over time.

Examples of suitable acid generating compounds that may be suitable for use in the delayed filter cake breakers useful in the treatment fluids and methods of the present invention include, but are not limited to, esters, aliphatic polyesters, ortho esters, poly (ortho esters), ortho ethers; poly(ortho ethers); lactides, poly(lactides), glycolides, poly(glycolides), lactones, ε-caprolactones, poly(ε-caprolactones), hydroxybutyrates, poly(hydroxybutyrates), anhydrides, poly (anhydrides), polyascorbic acid, aliphatic carbonates, aliphatic polycarbonates, amino acids, poly(amino acids), ethylene oxide, poly(ethylene oxide), and polyphosphazenes, or copolymers thereof. Derivatives and combinations also may be suitable. Other suitable acid-generating compounds may include formate esters, acetate esters, and lactate esters such as, but not limited to, ethylene glycol monoformate, ethylene glycol diformate, diethylene glycol diformate, glyceryl monoformate, glyceryl diformate, glyceryl triformate, triethylene glycol diformate, formate esters of pentaerythritol, glyceryl triacetate, methyl lactate, butyl lactate, and derivatives thereof. Other suitable materials may be disclosed in U.S. Pat. Nos. 6,877,563 and 7,021,383, both of which are incorporated by reference. Examples of acid-generating compounds that may be suitable in the present invention are commercially available from Halliburton Energy Services, Inc., of Duncan, Okla., under the trade names NFC-2, ED-1, and BDF-325.

In those embodiments where an acid generating compound is used in the treatment fluid, the acid generating compound may generate an acid downhole in a delayed fashion that may remove at least a portion of a filter cake present in the subterranean formation. The acid generating compounds may be reacted with small amounts of reactive materials such as mineral acids, organic acids, acidic anhydrides, p-toluenesulfonic acid, and the like to lower the pH to accelerate the hydrolysis of the acid generating compound if desired. Similarly, the hydrolysis rate may be slowed by the addition of a small amount of a strong base such as NaOH, $Na_2CO_3$, and $Mg(OH)_2$. The acid generating compound also may generate alcohols downhole that may be beneficial to the operation.

Any composition or method known in the art that is capable of producing an acid may be used in conjunction with the present invention. Additional examples of such compositions and methods include, but are not limited to, encapsulated acids, reaction of an aldehyde group with an oxidizer such as with reducing sugars, and/or any fermentation process that produces acid and oxidation of mineral surfaces.

In some embodiments, an acid generating compound may be present in a treatment fluid of the present invention in an amount of about 0.5% to about 40% by weight of the composition. In certain embodiments of the present invention, the acid generating compound may be provided in a concentrated aqueous solution prior to its combination with the other components necessary to form a treatment fluid of the present invention.

The delayed filter cake breakers useful in the treatment fluids and methods of the present invention also may comprise an enzyme. In certain embodiments, enzymes useful in the delayed filter cake breakers of the treatment fluids and methods of the present invention may catalyze the breakdown of an acid-generating compound to generate an acid. In certain embodiments, enzymes may be included in the delayed filter cake breakers useful in the treatment fluids or methods of the present invention at formation temperatures below about 160° F. Suitable enzymes may include, but are not limited to, starch specific enzyme, cellulose specific enzyme, guar specific enzymes, esterases, amylases, xanthanases, gluconases, cellulases, mannanases, and any combination thereof. Examples of suitable enzymes may includes, but are not limited to, those available commercially under the trade names NFC-3™ and NFC-4™, available from Halliburton Energy Services, Inc., of Duncan, Okla., as well as ARCASOLVE™, available from Cleansorb Limited of Guildford, Surrey, United Kingdom. In certain embodiments, the enzyme may be present in an amount of about 0.001% to about 1% by weight of the composition.

The delayed filter cake breakers useful in the treatment fluids and methods of the present invention may also comprise an oxidizer. Examples of suitable oxidizers may include, but are not limited to, t-butyl hydroperoxide and sodium perborate. In certain embodiments, the oxidizer may be present in an amount of about 0.001% to about 5% by weight of the composition.

The delayed filter cake breakers useful in the treatment fluids and methods of the present invention may also comprise an azo compound. Examples of suitable azo compounds may include, but are not limited to, 2,2'-azobis(2-amidinopropane), dihydrochloride, 2,2'-azobis-2-methyl-n-(2-hydroxyethyl)propionamide, 4,4'-azobis(4-cyanovaleric acid). In certain embodiments, the azo compound may be present in an amount of about 0.001% to about 1% by weight of the composition. Other free radical generators may be used as well.

The delayed filter cake breakers useful in the treatment fluids and methods of the present invention may also comprise sodium chlorite, hypochlorites, perborates, persulfates, and/or peroxides. Preferably the delayed filter cake breaker useful in the present invention is a peroxide source. Preferably, the peroxide source is an inorganic peroxide source such as peroxide compounds of zinc or alkaline earth metals. Magnesium peroxide is particularly preferred. Other peroxide sources known to those skilled in the art can be used without departing from the scope of the present invention.

Alkaline earth peroxides and zinc peroxide are known water insoluble compounds.

Inorganic peroxide compounds are commonly described as compounds whose structures include the peroxo-group, —O—O—. Simple peroxide compounds include peroxides in which the peroxo-group is bonded to a metallic atom via ionic bonding, and includes hydroperoxides characterized by the presence of the hydroperoxyl ion $(HO_2)^-$. Complex peroxide compounds include peroxides in which the peroxo-group as such, or in the form of $H_2O_2$ and $HO_2$, is bonded to the metallic atom by a covalent bond. Complex peroxide compounds also include the addition compounds formed with crystallized hydrogen peroxide.

The characteristic properties of peroxide compounds both simple and complex, are: the formation of hydrogen peroxide upon reaction with dilute acid solution, the liberation of oxygen as a result of thermal decomposition, and the liberation of oxygen upon reaction with water and other chemical agents. Further characterization is possible by dividing the simple inorganic peroxide compounds into four groups: (1) hydroperoxide, characterized by the $(HO_2)^-$ ion; (2) peroxides, characterized by the $(O_2)^{2-}$ ion; (3) superoxides characterized by the $(O_2)^-$ ion; and (4) ozonides, characterized by the $(O_3)^-$ ion.

The hydrolysis of peroxides and hydroperoxides proceeds as follows:

$$MO_2 + 2H_2O \rightarrow M(OH)_2 + H_2O_2$$

and $$MOOH + H_2O \rightarrow MOH^+ + H_2O_2$$

where M=metal. For this reason, peroxides and hydroperoxides are considered as being derived from hydrogen peroxide by replacement of one or both the hydrogen atoms by metal atoms.

Complex peroxide compounds include peroxyhydrates, for example, $CaO_2 \cdot 2H_2O_2$, and peroxyhydrate hydrates, for example, $BaO_2 \cdot H_2O_2 \cdot 20H_2O$.

Peroxides of calcium, strontium and barium belong to the $M^{2+}O_2^{2-}$ type of peroxide compounds, while peroxides of magnesium and zinc, of general formula $MO_2 \cdot xH_2O$, probably belong to the HO—M—OOH type where the covalent bond between the hydroperoxyl group and the metal atom is the same as that in hydrogen peroxide.

Calcium peroxide is generally prepared by industrial processes that provide a product containing 60-75 wt. % $CaO_2$. Reaction of $CaO_2 \cdot 8H_2O$ with solutions containing greater than 20 weight percent of hydrogen peroxide results in the formation of calcium peroxyhydrate, $CaO_2 \cdot 2H_2O_2$.

Strontium peroxide, industrial grade, generally contains 80-95% $SrO_2$. Industrial grade barium peroxide generally contains up to about 90% $BaO_2$. Depending on its method of production, industrial grade magnesium peroxide contains from about 25% $MgO_2$ to about 50% $MgO_2$ and generally is a mixture of peroxide, oxide, and magnesium oxide hydrate. Industrial grade zinc peroxide contains about 55% $ZnO_2$. For all purposes of the present invention, the term "peroxide" includes all forms of peroxides, including simple peroxides, such as hydroperoxides characterized by the $(HO_2)^-$ ion and peroxides characterized by the $(O_2)^-$ ion, and complex peroxides such as peroxyhydrates and peroxyhydrate hydrates.

Preferred peroxides for use in the present invention are zinc oxide; alkaline earth metal peroxide, such as magnesium peroxide and calcium peroxide; and organic peroxides such as t-butyl hydroperoxide, benzoyl peroxide, ascaridole, and the like. Optionally, free radical scavengers or reducing agents may be added to wellbore solution embodiments of the present invention. These materials may enhance the stability of the fluid and aid in avoiding premature degradation of the polysaccharide or other peroxide degradable polymers in the wellbore fluid. Representative reducing agents are water soluble sulfites, bisulfites, thiosulfates, dithionites, and mixtures thereof, particularly the alkali metal or ammonium salts thereof, preferably a water soluble thiosulfate, most preferably sodium thiosulfate. Representative antioxidants or free radical scavengers include water soluble mercaptans, thioethers, thiocarbonyls, low molecular weight alcohols and glycols, and mixtures thereof.

The preferred embodiment of the present invention utilizes a peroxide source that has been encapsulated. Prior art methods, such as that described in U.S. Pat. No. 5,783,527, suffer somewhat from premature release of peroxide that can degrade the filter cake and reduce the effectiveness of the polysaccharide polymers used for fluid loss and viscosifying purposes. This release occurs despite the formation of a coating of magnesium hydroxide that forms on the surface of the peroxide when it was added to water. This layer of magnesium hydroxide somewhat retards the release of peroxide. However, enough peroxide is still released to have negative effects on the filter cake and the properties of the drilling fluid.

It has been found that encapsulating the peroxide source can further aid in preventing the early release of peroxide. For the purposes of the present invention, an encapsulated peroxide is a peroxide that has a coating sufficient to control the release of peroxide until a set of conditions selected by the operator occurs. Some general encapsulating materials include natural and synthetic oils, natural and synthetic polymers and enteric polymers and mixtures thereof. However, many methods of encapsulating can be used without departing from the scope of the present invention. The preferred method of encapsulating the peroxide sources is by coating the peroxide with a polymer.

Similarly, many methods could be used to cause the release of the peroxide upon the occurrence of specific conditions desired by the operator. For example, the peroxide could be caused to be released by a change in temperature, pressure, pH, abrasion or any number of other environmental factors. A preferred method of releasing the peroxide for the purposes of dissolving a filter cake in a subterranean well is by having the peroxide release upon a change in pH in the down hole environment.

Those skilled in the art will appreciate that there are many possible mechanisms by which the coating may be removed. The methods discussed below are intended to illustrate possible methods by which this release might occur. This discussion is not intended to in any way limit the scope of the invention as set forth in the appended claims.

The coating polymer should preferably form a film around the peroxide source. The polymer should be chosen such that the coating will remain substantially intact until the desired release conditions occur. For the purposes of filter cake removal, it is preferable that the coating respond to changes in pH. The preferred polymers of the present invention are enteric polymers, which are defined for the purposes of this invention as polymers whose solubility characteristics are pH dependent. Here, this means that peroxide release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the peroxide source under predetermined conditions of pH or pH and temperature. Polymeric materials must meet two criteria to be useful in this invention. They must be dissolved or dispersed in water and must contain pendant acid functionality.

Preferably the polymeric material useful for the present invention is a film-forming emulsion (co)polymer composition, most preferably a metal crosslinked film-forming emulsion (co)polymer.

Metal crosslinked film-forming emulsion (sometimes referred to as latex) (co)polymer compositions are known, see U.S. Pat. Nos. 4,517,330; 5,149,745; 5,319,018, and 8,236,903 and US Publication Nos. 20110118409 and US 20110230612, all of which are incorporated herein in their entirety. Suitable metal crosslinked film-forming emulsion (co)polymers comprise one or more acid functionalized polymer and optionally one or more comonomer which are reacted with a multivalent metal compound at a temperature above or below the $T_g$ of the acid functionalized polymer to produce a crosslinked polymer.

The multivalent metal can be added as an aqueous soluble complex as described in U.S. Pat. No. 4,517,330, and/or as an aqueous insoluble complex as described in U.S. Pat. Nos. 5,319,018 and 5,149,745. If the multivalent metal is added as an insoluble complex, then it can be added at a temperature corresponding to or below the calculated $T_g$ of polymer and below the decomposition temperature of the polymer.

The multivalent metal compound is maintained in contact with the (co)polymer for a time sufficient to allow reaction to occur. The process produces a metal crosslinked filmforming emulsion that dries to a crosslinked polymer film. Preferably, the metal crosslinked film-forming emulsion (co)polymer is a metal crosslinked acrylic polymer, preferably magnesium, calcium, or copper crosslinked acrylic polymer, most preferably zinc crosslinked acrylic polymer.

Polymers that contain acid functionality only as terminal or end groups do not produce the desired crosslinked polymer film properties. The acid functionality may be incorporated in the polymer by known means using an effective amount, preferably from 4 to 90% by weight of the total monomers of acidic monomers. Examples of acidic monomers are ethylenically unsaturated acid monomers, such as acrylic acid, methacrylic acid, maleic acid, itaconic acid, maleic anhydride, vinyl phenol and mixtures thereof.

Other monomers in the polymer preparation are selected to produce the desired end use and application properties sought and include the polymerizable comonomers which form soft polymers in the presence of free radical catalysts and those that produce hard polymers in the presence of free radical catalysts. Examples of comonomers which polymerize to form soft polymers include primary and secondary alkyl acrylate, with alkyl substituents up to eighteen or more carbon atoms, primary or secondary alkyl methacrylates with alkyl substituents of five to eighteen or more carbon atoms, or other ethylenically-unsaturated compounds which are polymerizable with free radical catalysts to form soft solid polymers, including vinyl esters of saturated monocarboxylic acids of more than two carbon atoms. The preferred ethylenically unsaturated compounds are the stated acrylates, itaconates, and methacrylates, and of these the most preferred esters are those with alkyl groups of not more than 8 carbon atoms.

The preferred monomers which by themselves yield soft polymers may be summarized by the formula:

wherein R' is hydrogen or a methyl group and, when R' is methyl R$^x$ represents a primary or secondary alkyl group of 5 to 18 carbon atoms, and when R' is hydrogen, R$^x$ represents an alkyl group of not over 18 carbon atoms, preferably of 2 to 8 carbon atoms and more preferably 2 to 4 carbon atoms.

Typical compounds coming within the above definition are ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexylacrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylhexyl methacrylate, 2-ethylbutyl methacrylate, octyl methacrylate, 3,5,5-trimethylhexyl methacrylate, decyl methacrylate, dodecyl methacrylate, octadecyl methacrylate, and those with substituted alkyl groups such as butoxyethyl acrylate or methacrylate.

Another group of monomers which by themselves yield soft polymers are butadiene, chloroprene, isobutene, and isoprene. These are monomers commonly used in rubber latices along with a hard monomer also useful in this invention, such as acrylonitrile, styrene, and other hard monomers as given above. The olefin monomers, particularly ethylene and propylene, are also suitable soft monomers.

Examples of polymerizable ethylenically unsaturated monomers which by themselves form hard polymers, are alkyl methacrylates having alkyl groups of not more than four carbon atoms and alkyl acrylates having alkyl groups of not more than 2 carbon atoms also tert-amyl methacrylate, ter-butyl or tert-amyl acrylate, cyclohexyl, benzyl or isobornyl acrylate or methacrylate, acrylonitrile, or methacrylonitrile, these constituting a preferred group of the compounds forming hard polymers. Styrene, vinyl chloride, chloride, chlorostyrene, vinyl acetate and a-methylstyrene, which also form hard polymers, may be used.

Preferred monomers, which by themselves form hard polymers, may be summarized by the formula:

wherein R' is hydrogen or a methyl group and wherein X represents one of the groups —CN, phenyl, methylphenyl, and ester-forming groups, —COOR", wherein R" is cyclohexyl or methyl or ethyl or a ted-alkyl group of four to five carbon atoms, or, when R' is methyl, an alkyl group of two to four carbon atoms. Some typical examples of these have already been named. Other specific compounds are methyl methacrylate, ethyl methacrylate, propyl methacrylate, isopropyl methacrylate, isobutyl methacrylate, n-butyl methacrylate, sec-butyl methacrylate, and tert-butyl methacrylate. Acrylamide and methacrylamide may also be used as hardening components of the copolymer.

A further class of polymers of this invention is polymers of the esters of vinyl alcohol such as vinyl formate, vinyl acetate, vinyl propionate, vinyl butyrate and vinyl versitate. Preferred is poly(vinyl acetate) and copolymers of vinyl acetate with one or more of the following monomers: vinyl chloride, vinylidene chloride, styrene, vinyl toluene, acrylonitrile, methacrylonitrile, acrylate or methacrylate esters, and the functional group containing monomers given above.

These polymers can be prepared, for example by emulsion copolymerization of the several monomers in the proper proportions. Conventional emulsion polymerization techniques are described in U.S. Pat. Nos. 2,754,280 and 2,795,564. Thus the monomers may be emulsified with an anionic, a cationic, or a nonionic dispersing agent, about 0.5% to 10% thereof being used on the weight of total monomers. When water-soluble monomers are used, the dispersing agent serves to emulsify the other, less soluble monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2% each based on the weight of monomers to be copolymerized. The polymerization temperature may be from room temperature to 90° C. or more as is conventional.

Examples of emulsifiers or soaps suited to this polymerization process include alkali metal and ammonium salts of alkyl, aryl, alkaryl, and aralkyl sulfonates, sulfates, and polyether sulfates; the corresponding phosphates and phosphonates; and ethoxylated fatty acids, alcohols, amines, amides, and alkyl phenols.

Chain transfer agents, including mercaptans, polymercaptans, and polyhalogen compounds, are often desirable in the polymerization mix.

Staged or sequential copolymers can also be crosslinked according to the invention. Particularly useful first stage copolymers are ethylene/ethylacrylate copolymers and ethylene/vinyl acetate copolymers containing added hydrophilic monomer.

Unless otherwise indicated, "T$_g$" is the glass transition temperature and "T$_m$" is the melting temperature if the metal crosslinked film-forming emulsion (co)polymer.

All of the transition metals are capable of forming polymeric crosslinks, though care must be exercised when considering the use of arsenic, mercury, cobalt, copper, lead, cadmium, nickel and chromium for a specific application due to high cost, toxicity, or the production of a color in the polymeric film. Certain transition metals such as aluminum, tungsten, and tin that could not be used in latent metal salt crosslinking because of their inability to form a stable amine complex are useful in the present invention. Combinations of transition metals may be effectively used.

The preferred metals, based on criteria of low cost, low toxicity, and low color in the crosslinked film, include zinc, aluminum, tin, tungsten and zirconium. Zinc and aluminum are particularly preferred. Useful compounds of the transition metals include the oxide, hydroxide, carbonate and acetate (usually the basic acetate due to the solubility concern discussed below).

When used in emulsion or dispersions of acid-containing polymer, the metal compounds must be relatively insoluble since even moderately soluble salts (i.e., ≥0.4% in water at 60° C.) can produce excessively high levels of multivalent cations in solution. High levels of multivalent cations can cause dispersions or emulsions of acid-containing polymer to precipitate or sediment from the dispersion or emulsion because of the polymer's multivalent cation instability (the double layer is believed to be disrupted by multivalent cations). This requirement for a low solubility transition metal compound does not apply to acid-containing polymers in aqueous solution, but only to aqueous dispersions and emulsions of acid-containing polymers.

Preferably, the metal crosslinked film-forming emulsion (co)polymer has a $T_g$ or $T_m$ equal to or greater than the down hole formation temperature. Preferably, the metal crosslinked film-forming emulsion (co)polymer has a $T_g$ equal to or greater than 45° C., more preferably equal to or greater than 65° C., more preferably equal to or greater than 90° C., and more preferably equal to or greater than 120° C. It is further desirable that the metal crosslinked film-forming emulsion (co)polymer has good compatibility with the surface of the peroxide it is coating. Good compatibility means that certain bonding is formed between acid group in metal cross-linked emulsion (co)polymer film and the hydroxide group on the surface of the peroxide.

Films from the metal cross-linked acrylic polymers of the present invention have very different properties than films from non- metal cross-linked acrylics, for example, have higher tensile strength modulus and durability. Swell ratio gives an indication of the extent of cross-linking of the final film—low swell ratio means tightly cross-linked and high swell ratio less cross-linked. Films from zinc cross-linked polymers swell less in basic solution than films from non-zinc polymers. Not to be held to any particular theory, we believe that at high pH (before the peroxide is activated by adding acid) the film of the present invention swell less and is less permeable to the filter cake breaker, e.g., magnesium peroxide, and therefore less likely to exhibit premature release. The film formed from the metal crosslinked film-forming emulsion (co)polymer preferably has a low swelling ratio at pH 10 and a high swelling ratio at pH 5. Swell ratio is equal to the mass of swollen polymer film/mass of dry polymer film. Preferred the swell ratio at pH 10 is equal to 1 and infinitely large at pH 5.

The application of the metal crosslinked film-forming emulsion (co)polymer to encapsulate the filter cake breaker may be carried out in any suitable manner. The microparticles of the filter cake breaker and other coating components are mixed together to form an aqueous slurry. Unless otherwise indicated, weight percent of components is based on the final dry weight of the encapsulated internal breaker.

A good summary of encapsulation methods can be found in "Recent Development in Microencapsulation of Food Ingredient" Drying Technology Vol: 23, Page: 1361-1394, Year: 2005.

Preferably, the metal crosslinked film-forming emulsion (co)polymer is applied to the surface of the filter cake breaker by the method of spray drying. Spray drying is preferably done with an inlet temperature of from 100° C. to 160° C., preferably 120° C. to 140° C. Spray drying is preferably done with an outlet temperature of from 30° C. to 90° C., preferably 60° C. to 75° C. Optionally, the sprayed dried material may be heat treated. For example, the film encapsulated filter cake breaker may be thermally annealed at a temperature close to the $T_g$ or $T_m$ of metal crosslinked film-forming emulsion (co)polymer, typically in the range of from 90° C. to 125° C. for a period of time of from 45 to 90 minutes depending on the $T_g$ or $T_m$ of the metal crosslinked film-forming emulsion (co)polymer.

In another embodiment, the metal crosslinked film-forming emulsion (co)polymer is applied to the surface of the filter cake breaker by utilizing a fluidized bed.

In yet another embodiment, the metal crosslinked film-forming emulsion (co)polymer is applied to the surface of the filter cake breaker by vaporization plus grinding.

In yet another embodiment, the metal crosslinked film-forming emulsion (co)polymer is applied to the surface of the filter cake breaker by extrusion coating.

In yet another embodiment, the metal crosslinked film-forming emulsion (co)polymer is applied to the surface of the filter cake breaker by coacervation.

In yet another embodiment, the metal crosslinked film-forming emulsion (co)polymer is applied to the surface of the filter cake breaker by inclusion complexation.

Preferably, the filter cake breaker is present in the encapsulated internal breaker in an amount of from 30 to 90 weight percent, more preferably of from 40 to 90 weight percent, and even more preferably of form 60 to 90 weight percent based on the total weight of the encapsulated internal breaker.

Preferably the encapsulating polymer, such as the metal crosslinked film-forming emulsion (co)polymer, is present in the encapsulated internal breaker in an amount of from 5 to 55 weight percent, more preferably of from 10 to 45 weight percent, and even more preferably of from 15 to 25 weight percent based on the weight of the encapsulated internal breaker.

In a preferred embodiment of the present invention we have found that it is advantageous to include an anti-caking agent during the encapsulation of the oxidizing agent. The anti-caking agent helps to reduce agglomerization and/or facilitates particle size control of the final encapsulated oxidizing agent. Preferred anti-caking agents are insoluble metal carbonate microparticles such as magnesium carbonate or calcium carbonate; colloidal silica micro particles, for example suspensions of fine amorphous, nonporous, and typically spherical silica particles in liquid phase; and clay particles such as bentonite, and the like.

In one embodiment, microparticles of the uncoated filter cake breaker are spray dried together with a dispersion consisting of a metal crosslinked film-forming emulsion (co)polymer and an anti-caking agent. Preferably, the anti-caking agent is present in an amount of form 3 to 45 weight percent, more preferably 5 to 20 weight percent, even more preferably 6 to 10 weight percent based on the total weight of the encapsulated internal breaker. During this process, the metal crosslinked film-forming emulsion (co)polymer particles partially collapse onto the filter cake breaker's surface to form a discontinuous film. The anti-caking agent maintains its particulate morphology and is embedded into the above discontinuous film. Afterwards, the spray-dried encapsulated microparticles are thermally annealed at the $T_g$ or $T_m$ of the metal crosslinked film-forming emulsion (co) polymer to promote the formation of continuous film on filter cake breaker's surface. The presence of anti-caking particles in the polymer film prevents the encapsulated powders from further agglomeration, which is critical for controlling the particle size.

Optionally, the encapsulated internal breaker comprises a water-soluble polymer as a binder. If present, the water-soluble polymer is present in an amount of from 1 to 5 weight percent based on the weight of the encapsulated internal breaker. The role of the water-soluble polymer is to enhance the viscosity of the formulated filter cake breaker slurry so that uncoated filter cake breaker microparticles do not readily precipitate out of the slurry prior to spry drying or whatever method is used for encapsulation. As the water evaporates from the encapsulation process, the water-soluble polymer chains also collapse on the surface of the oxidizing agent microparticles to form a minor component in the metal crosslinked emulsion (co)polymer film. Examples of suitable water-soluble polymers are polyacrylamide, polyacrylic acid, poly(N-isopropylacrylamide), poly (dimethylaminoethyl acrylate), polyvinyl alcohol, polyethylene oxide and copolymers of the above mentioned polymers.

In the case where pH alone is used to control peroxide release, a preferred illustrative embodiment of the present invention is to select as an encapsulating material an enteric polymer that is substantially insoluble at pH values equal to or greater than 7.5 and that is more soluble under conditions of decreasing pH. Thus as the pH decreases in value (i.e. the solution becomes more acidic) release of peroxide is promoted. In one preferred illustrative embodiment the enteric polymer encapsulated peroxide is combined with an alkaline wellbore fluid of the type described above. This fluid is then pumped into the wellbore and a filter cake is formed that incorporates the encapsulated peroxide. The peroxide source can now be activated by causing the down hole environment to become more acidic and thereby degrade the encapsulating material. Again, it should be emphasized that this is merely one possible mechanism by which the peroxide release may occur in the down hole environment. Those skilled in the art will recognize that other factors, or a combination of factors, may in fact result in the peroxide's release. The methods discussed here are intended to illustrate possible mechanisms by which peroxide release may occur and are not intended to narrow the scope of the invention, as defined by the claims herein.

For example, abrasion may contribute to peroxide release. As discussed above, peroxides, such as magnesium peroxide, may form a protective coating when added to water. It is possible that the metal crosslinked film-forming emulsion (co)polymer enhances this natural coating, making the peroxide more resistant to abrasion. This abrasion resistance may result in the peroxide being more stable in the down hole environment and allowing its release to be more precisely controlled.

When the filter cake is no longer needed, it can be easily removed. In order to remove the filter cake, the peroxide source should be activated such that peroxide is released in the down hole environment. The peroxide will then react with and degrade any peroxide degradable polymers in the filter cake. As mentioned above, many different methods of activating the peroxide source can be used without departing from the scope of the present invention.

In a one illustrative embodiment where a peroxide coated with a metal crosslinked film-forming emulsion (co)polymer is used, the method of activating the peroxide is by changing the pH value of the down hole environment. Preferably, an alkaline wellbore fluid is used to deliver the peroxide and form the filter cake. Subsequently, the down hole environment is made more acidic, causing the release of peroxide.

For the general purposes and scope of the present invention, the method of causing the down hole environment to become more acidic is not limited to any particular method. However, two preferred methods will be discussed. Generally, it has been discovered that milder clean up treatments than those reported in the prior art can be successfully used to remove peroxide containing filter cakes.

One such method is to add an acid source to the down hole environment from the surface. According to this method, an acidic soak solution is added to the well. The acidic soak solution will activate the peroxide, which will release peroxide, causing the peroxide degradable polymers (for example, polysaccharides) to degrade. The acid, depending about the acid selected and the strength of the acid, may also decompose the peroxide degradable polymers to some extent and may also be used to decompose acid soluble bridging agents (such as calcium carbonate). Additionally, the acid soak can be used remove an encapsulating material from the peroxide source, such as removing an acid soluble enteric polymer coating.

After decomposing the polysaccharide polymers with the acid solution, it is preferred that the filter cake containing the decomposed polymer be washed with a wash fluid in which the bridging particles are soluble, such as by contacting or circulating within the borehole the washing fluid. In this manner, the major components of the filter cake are decomposed or removed, and the filter cake is effectively destroyed and removed from the sides of the borehole.

In one non-limiting example of a cleanup solution, it is preferred that the acidic soak solution have no appreciable solubilizing effect on the bridging particles within the filter cake. This prevents the premature breakthrough of the soak solution through a portion of the filter cake and, hence, allows all of the filter cake to be contacted by the soak solution until the peroxide has decomposed the polysaccharide polymers substantially. If the bridging particles are water soluble, preferably the aqueous liquid in the soak solution will be saturated with respect to the bridging particles. Thus if the bridging particles are sized sodium chloride, the aqueous liquid will preferably be saturated with respect to sodium chloride. Additionally, the soak solution should have a density that is compatible with the density of the liquid in the borehole that the soak solution displaces in order to minimize mixing of the soak solution with the liquid. Preferably the soak solution contains inorganic water soluble salts dissolved therein in amounts up to saturation to provide the desired density. Typical salts are generally selected from the group consisting of sodium chloride, sodium bromide, potassium chloride, potassium bromide, calcium chloride, calcium bromide, zinc chloride, zinc bromide, sodium formate, potassium formate, cesium formate, and mixtures thereof. Certain of these salts are acidic, and, thus, they may also function as acidic substances to provide the required pH.

In this example, it is preferred that the soak solution be solids-free, i.e., contain no appreciable content of suspended solids, thus contains essentially only dissolved substances. The soak solution may be filtered using procedures well known in the art of using clear brine fluids, if desired.

Although many types of clean up fluids can be used, one example is a soak solution that is preferably acidic to solubilize and activate the peroxide in the filter cake. As mentioned above, it has been discovered that milder clean up solutions can be used than those reported in the prior art. Representative acidic substances include hydrochloric acid, phosphoric acid, formic acid, acetic acid, proprionic acid, glycolic acid, sulfamic acid, citric acid, aluminum chloride, zinc chloride, zinc bromide, calcium bromide, ferric chloride, sodium dihydrogen phosphate, sodium acid pyrophosphate, acidic buffers, and the like. Sulfamic acid and citric acid are preferred.

In certain clean up solutions, it may be preferable, as will be appreciated by those skilled in the art, that the acidic solution comprise an acid in a saturated solution of a water soluble salt in which the bridging particles are not soluble, and that the bridging particles are water soluble. It is particularly preferred that the water soluble salt and the bridging particles are sodium chloride.

When clean up solutions such as those described above are used, the soak solution should contact the filter cake for a period of time that is at least sufficient to decompose the polysaccharide polymers in the filter cake to such an extent that the filter cake becomes a loosely adherent mass of bridging particles. The greater the acid strength or the higher the formation temperature, and hence, the higher the temperature to which the soak solution is heated, the lower the time required to contact the filter cake with the soak solution. Generally, the soak solution will contact the filter cake from approximately one-half to ten hours. Thereafter the filter cake is preferably contacted with a wash solution to remove the remaining filter cake solids, principally the bridging particles and any remaining polymers and polymer degradation products.

The wash solution is one in which the bridging particles are at least partially soluble. Thus if the bridging solids are water soluble, the wash solution is undersaturated with respect to the bridging solids. If the bridging solids are acid soluble, a suitable acidic solution is used as the wash solution. If the bridging solids are oil or solvent soluble, a suitable oil or solvent is used as the wash solution.

It is preferred that the wash solution have no appreciable effect on the permeability of the hydrocarbon-containing formation. Thus aqueous solutions containing one or more salts which inhibit the swelling and/or dispersion of particles within the formation are preferred. Representative of such salts are potassium salts, such as potassium chloride and potassium acetate, ammonium chloride, quaternary ammonium salts of low molecular weight, such as tetramethyl ammonium chloride, tetraethylammonium chloride, and in general tetraalkylammonium salts in which the alkyl groups independently contain from 1 to about 4 carbon atoms, and other salts as is known in the art. Preferably the wash solution will contain from about 0.05% to about 10% by weight of the salt, most preferably from about 0.1% to about 5%. It is particularly preferred that the wash solution contain from about 2% to about 5% by weight potassium chloride or ammonium chloride.

A second illustrative method of acidifying the down hole environment such that a peroxide source is activated has been discovered in which fluids produced from the subterranean formation can be successfully used. It is known that formation fluids are typically acidic due to the presence of carbon dioxide, sulfur, mineral acids, oxygen and organic acids. Typically, these substances have been problematic due to their corrosive effects on wellbore apparatus; see, for example, U.S. Pat. Nos. 4,837,323; 5,960,878; and 6,248,700.

The acidic formation fluids can be used to activate peroxide sources in the down hole environment, obviating the need for acid solutions to be added to the wellbore. This is advantageous because it saves the operator the money otherwise spent on the acid treatments, labor costs and lost rig time while administering the acid soak and avoids possible damage to the subterranean formations from the acid soak and wash solutions. However, additional fluids may be used in addition to the produced fluids without departing from the scope of the present invention, so long as a substantial portion of produced fluids are used. For purposes of the present invention, a substantial portion of produced fluids means an amount sufficient to cause a change in the pH value of a down hole environment.

The formation fluids can be the stimulus that results in the removal of an encapsulating material from a protected peroxide source. In particular, the formation fluids can be used to lower the pH of a filter cake containing peroxides encapsulated in an enteric polymer. The formation fluids may activate peroxides coated with an enteric polymer.

In either method of acidifying the down hole environment, an activator can be included in the acidic soak solution to further activate the peroxide and/or to increase the rate of reaction between the peroxide and the polysaccharide. Known activators include iron and copper salts as well as salts of other transition metals, such as soluble ferric, ferrous, cuprous, cobaltous, nickelous, manganous, and the like salts. The activator should be soluble in the soak solution. The preferred metallic cation activator is a source of the ferric or ferrous cation, such as ferrous sulfate, ferrous ammonium sulfate, ferrous chloride, ferric ammonium sulfate, and the like. The amount of activator, if used, is not critical and need only be sufficient to provide the desired rate of reaction. Generally, a metallic cation activator will be present in an amount from about 0.00025% to about 0.0025% by weight of the soak solution.

The following examples are included to demonstrate certain illustrative embodiments the invention. However, those of skill in the art should appreciate that many changes, consistent with the present disclosure, can be made in the specific embodiments which are disclosed and still obtain a like or similar result without departing from the scope of the invention.

EXAMPLES

A description of the raw materials used in the Examples is as follows.

$MgO_2$ is a magnesium peroxide with greater than 95 percent of the particles having a particle size less than 100 micrometers available from Solvay Chemicals as IXPER 35M™.

AP is a latex emulsion comprising 48 weight percent non-crosslinked acrylic polymer (25% butyl acrylate/47% meth methacrylate/10% 2-hydroxyethyl methylacrylate/18% methacrylic acid) with a mean particle size of 230 nanometers in water.

XAP-1 is a latex emulsion having a pH of 8.5 comprising 50 weight percent zinc crosslinked (0.58 equivalents) acrylic polymer (35% butyl acrylate/9% meth methacrylate/40% styrene/16% methacrylic acid) with a mean particle size of 110 nanometers as described in U.S. Pat. No. 4,517,330, 30 weight percent water, and about 20 weight percent solvents and emulsion stabilizers.

XAP-2 is a latex emulsion comprising 33 weight percent zinc crosslinked (0.58 equivalents) acrylic polymer (35% butyl acrylate/9% meth methacrylate/40% styrene/16% methacrylic acid) with a mean particle size of 100 nanometers as described in U.S. Pat. No. 4,517,330, 50 weight percent water, and about 17 weight percent solvents and emulsion stabilizers.

XAP-3 is a latex emulsion having a pH of 9 comprising 37 weight percent zinc crosslinked (0.76 equivalents) acrylic polymer (28% butyl acrylate/52% meth methacrylate/12% styrene/8% methacrylic acid) with a mean particle size of 80 nanometers as described in U.S. Pat. No. 6,548,596, 42 weight percent water, and about 21 weight percent solvents and emulsion stabilizers.

CaCO₃ is an ultrafine ground calcium carbonate available from Omya Canada. Inc., as HYDROCARB™ 90.

PAM-PAA is the sodium salt of a water soluble poly (acrylamide-co-acrylic acid) copolymer with a molecular weight of 200,000 available from PolyScience, Inc.

Encapsulation Procedure

Encapsulation is carried out using a Mobile Miner spray dryer equipped with a two-fluid nozzle atomizer manufactured by GEA Niro. Nitrogen ($N_2$) pressure to the nozzle is normally set at 1 bar with 50% flow rate, equivalent to 6 kg/hr of air flow. The magnesium peroxide powder, acrylic encapsulation polymer, anti-caking agent (calcium carbonate), and water-soluble polymer binder (poly(acrylamide-acrylic acid sodium salt)) are mixed and diluted with deionized water under magnetic stirring for 5 to 10 minutes to make 25 weight percent slurry. The slurry is introduced into spray dryer by a rotator pump. The inlet temperature was set at 125° C. and the outlet temperature is controlled at 65° C. Once the atomized slurry droplet is sprayed into the chamber, water is rapidly vaporized by contact with hot $N_2$ at the inlet temperature. The dried powders are then cooled to the outlet temperature as they are pulled out of the chamber by a vacuum fan. Most of the dried powder is separated from the $N_2$ flow in the cyclone and recovered in the glass jar attached to the bottom of the cyclone via an open valve. Residual powders are filtered before ventilation. The spray-dried encapsulated magnesium peroxide samples are thermally treated by annealing at 90° C. for 90 min in an oven under ambient atmosphere and allowing it to cool at room temperature.

Particle Size Analyses

The encapsulated magnesium peroxide samples are re-dispersed into deionized water to make 1 to2 wt % solutions prior to analysis. Particle size and distribution are measured by a Beckman Coulter LS 230 (Brea, Calif.) laser light scattering particle size analyzer under standard procedures and analyzed using a polystyrene latex model preset by the instrument software (For details, please see Schmidt, D.; Malotky, D. "Particle Size Distribution of Aqueous Emulsions by Laser Diffraction with a Beckman Coulter LS230" DOWN 101979-E03A).

The compositions and properties for Examples 1 to 7 are shown in Table 1. Compositions are given in weight percent based on the total weight of the dried encapsulated magnesium peroxide sample.

TABLE 1

| | Example | | | | | | |
|---|---|---|---|---|---|---|---|
| | 1* | 2 | 3 | 4 | 5 | 6 | 7 |
| Composition, wt % | | | | | | | |
| MgO₂ | 73.6 | 73.6 | 49 | 73.6 | 49 | 73.6 | 49 |
| AP | 18.4 | | | | | | |
| XAP-1 | | 18.4 | 36.7 | | | | |
| XAP-2 | | | | 18.4 | 36.7 | | |
| XAP-3 | | | | | | 18.4 | 36.7 |
| CaCO₃ | 6.2 | 6.2 | 12.5 | 6.2 | 12.5 | 6.2 | 12.5 |
| PMA-PAA | 1.8 | 1.8 | 1.8 | 1.8 | 1.8 | 1.8 | 1.8 |
| Properties | | | | | | | |
| Mean Particle Size, micrometers | 10 | 9 | 13 | 10 | 15 | 20 | 45 |

*not an example of the present invention

Peroxide Release Profile

The peroxide release profile is produced using 2 different methods:

Method 1. Quantitative Premature Peroxide Release
1) 0.20 g encapsulated magnesium peroxide sample is mixed with 12.5 ml of deionized water in an ACE pressure vessel.
2) The vessel is hot rolled at 20 rpm in a ball-mill oven at 75° C.
3) The vessel is removed from the oven to take a sample aliquot (20 µl) at time intervals of 2, 4, 6 and 8 hours.
4) The sample aliquot is diluted 100 times with deionized water.
5) The peroxide level in the above diluted sample aliquot is quantitatively determined using a colorimetric hydrogen peroxide assay kit (Catalog Number: STA-343, Cell Biolabs, Inc). 20 µl diluted sample aliquot is further mixed with 200 µl aqueous working reagent, followed by 30 minutes incubation on a shaker at room temperature. The resulting mixture solution is scanned from 540 nm to 600 nm. The peroxide level of the diluted sample is determined from the absorbance at 585 nm, from which the actual peroxide level in the original sample solution is calculated.

Method 2. Semi-Quantitative Triggered Peroxide Release
1) 0.20 g encapsulated internal breaker sample was mixed with 12.5 ml of deionized water in an ACE pressure vessel.
2) The vessel was hot rolled at 20 rpm in a ball-mill oven at 75° C. for 16 hours.
3) The ACE vessel was removed from the oven for adding 25 mL of a 5 wt % Na₂EDTA solution to reduce the pH from 10 to 5.5. The sample mixture is then returned to the oven and further hot rolled at 20 rpm and 75° C.
4) The vessel was removed from the oven to take a sample aliquot (50 µl) at time intervals of 1, 2, 4, 6 and 8 hours.
5) The sample aliquot is diluted 40 times with deionized water. The peroxide level of the diluted sample is read from the peroxide testing paper (Merck 10011-1: 0~25 mg/L), which is converted to the actual peroxide level in the original undiluted sample solution.

Figure 1:
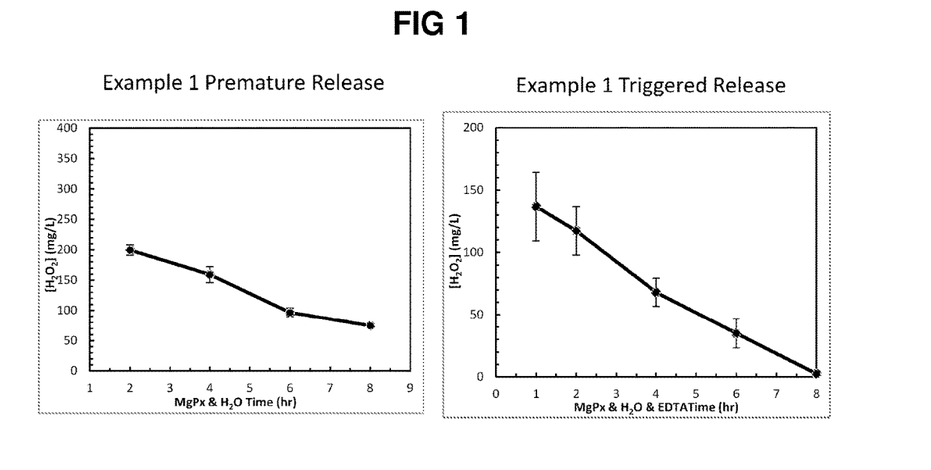
FIG. 1 is graphs showing premature and triggered peroxide release for Example 1, not an encapsulated internal breaker the present invention.
Figure 2:
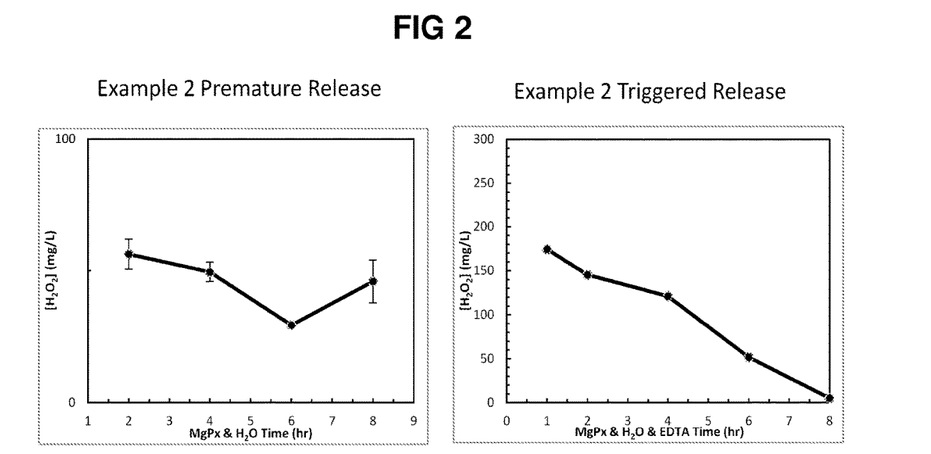
FIG. 2 is graphs showing premature and triggered peroxide release for Example 2, an encapsulated internal breaker of the present invention.
Figure 3:
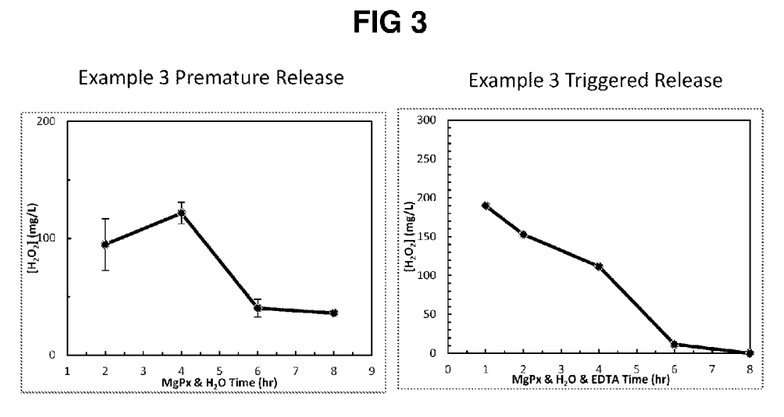
FIG. 3 is graphs showing premature and triggered peroxide release for Example 3, an encapsulated internal breaker of the present invention.
Figure 4:
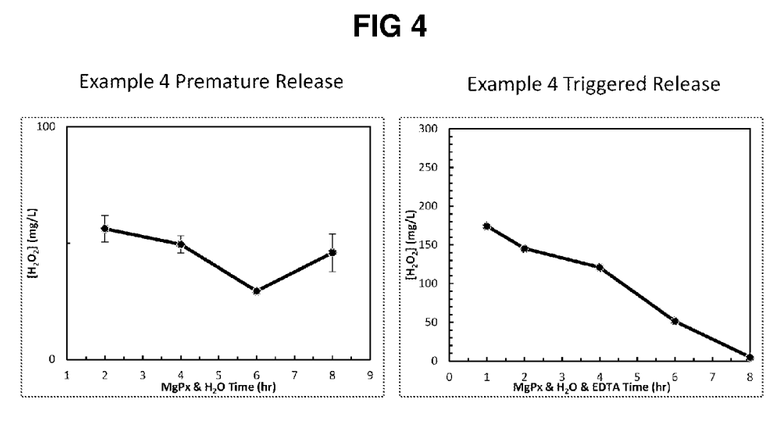
FIG. 4 is graphs showing premature and triggered peroxide release for Example 4, an encapsulated internal breaker of the present invention.
Figure 5:
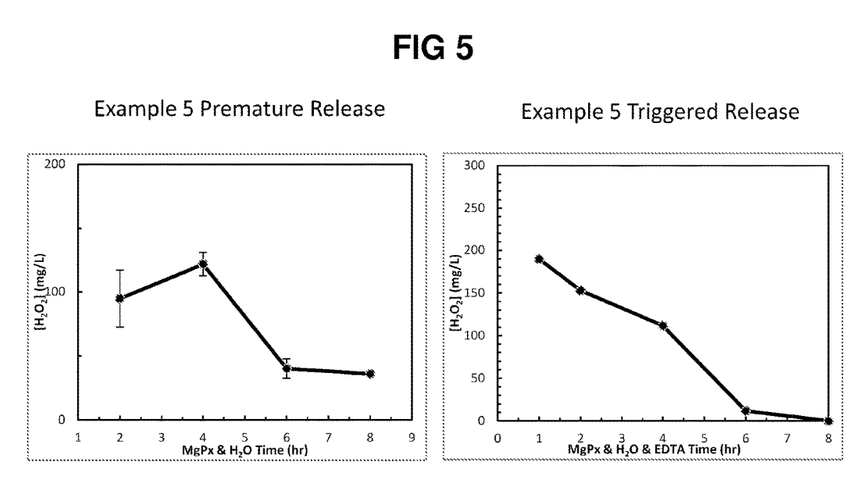
FIG. 5 is graphs showing premature and triggered peroxide release for Example 5, an encapsulated internal breaker of the present invention.
Figure 6:
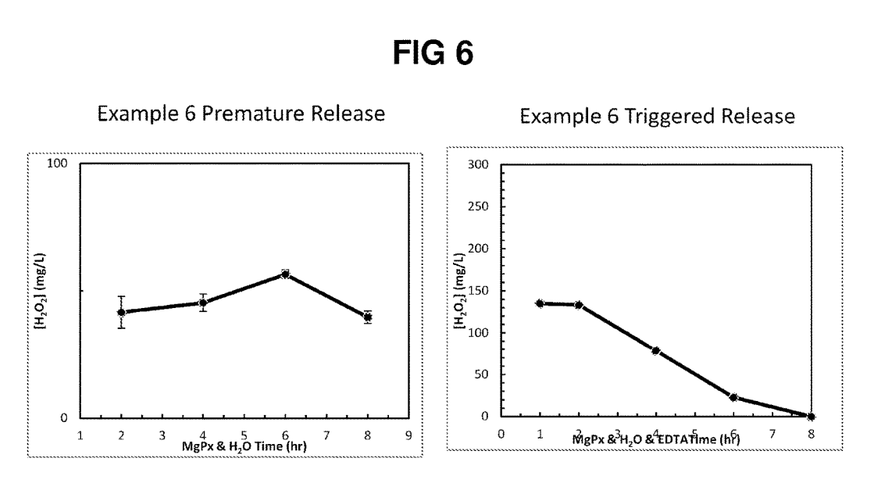
FIG. 6 is graphs showing premature and triggered peroxide release for Example 6, an encapsulated internal breaker of the present invention.
Figure 7:
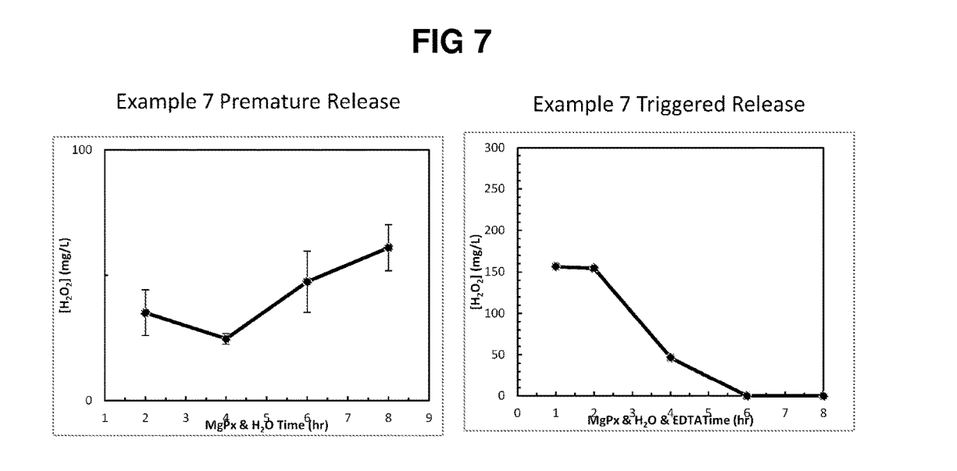
FIG. 7 is graphs showing premature and triggered peroxide release for Example 7, an encapsulated internal breaker of the present invention.

The peroxide release profiles for Examples 1 to 7 are shown in FIGS. 1 to 7, respectively.

What is claimed is:

1. An encapsulated internal breaker for the removal of a filter cake from a wellbore in a subterranean formation, the encapsulated internal breaker comprising:
   i a filter cake breaker, the filter cake breaker being magnesium peroxide, zinc peroxide, or an alkaline earth metal peroxide,
   ii an anti-caking agent, the anti-caking agent being magnesium carbonate, calcium carbonate, colloidal silica micro particles, or clay particles, and
   iii an encapsulation film that encapsulates the filter cake breaker, the encapsulation film comprising a magnesium-, calcium-, copper-, aluminium- or zinc-crosslinked acrylic polymer which is insoluble in well bore fluids having a pH value equal to or greater than 7.5.

2. The encapsulated internal breaker of claim 1 wherein the metal-crosslinked acrylic polymer is the zinc-crosslinked acrylic polymer.

3. The encapsulated internal breaker of claim 1 wherein the water soluble polymer is present in an amount of from 1 to 5 weight percent based on the total weight of the encapsulated internal breaker.

4. The encapsulated internal breaker of claim 1 wherein the metal-crosslinked acrylic polymer is the zinc-crosslinked acrylic polymer having a weight percent of zinc crosslinked from 33% to 50%.

5. The encapsulated internal breaker of claim 1 wherein the magnesium-, calcium-, copper-, aluminium- or zinc-crosslinked acrylic polymer has a Tg equal to or greater than 45° C.

6. The encapsulated internal breaker of claim 1 further comprising a water-soluble polymer as a binder.

7. A wellbore fluid comprising a degradable polymer and an encapsulated internal breaker, wherein the encapsulated internal breaker comprises:
   i a filter cake breaker, the filter cake breaker being magnesium peroxide, zinc peroxide, or an alkaline earth metal peroxide,
   ii an anti-caking agent, the anti-caking agent being magnesium carbonate, calcium carbonate, colloidal silica micro particles, or clay particles, and
   iii an encapsulation film that encapsulates the filter cake breaker, the encapsulation filing comprising a magnesium-, calcium-, copper-, aluminium- or zinc-crosslinked acrylic polymer which is insoluble in well bore fluids having a pH value equal to or greater than 7.5.

8. The well bore fluid of claim 7 wherein
   i the filter cake breaker is magnesium peroxide,
   ii the anti-caking agent is calcium carbonate, and
   iii the encapsulation film includes the zinc-crosslinked acrylic polymer.

9. The well bore fluid of claim 7 further comprising a water-soluble polymer as a binder.

10. A process for the removal of a filter cake from a wellbore in a subterranean formation comprising the steps:
   a adding one or more degradable polymer to a wellbore fluid;
   b adding an encapsulated internal breaker to a wellbore fluid;
   c pumping said wellbore fluids into the wellbore; and
   d changing the pH of the fluid in the wellbore so as to activate the degradable polymer;
   wherein the encapsulated internal breaker comprises:
      i an filter cake breaker, the filter cake breaker being magnesium peroxide, zinc peroxide, or an alkaline earth metal peroxide,
      ii an anti-caking agent, the anti-caking agent being magnesium carbonate, calcium carbonate, colloidal silica micro particles, or clay particles, and
      iii an encapsulation film that encapsulates the filter cake breaker, the encapsulation filing comprising a magnesium-, calcium-, copper-, aluminium- or zinc-crosslinked acrylic polymer which is insoluble in well bore fluids having a pH value equal to or greater than 7.5.

11. The process of claim 10 wherein
   i the filter cake breaker is magnesium peroxide,
   ii the anti-caking agent is calcium carbonate, and
   iii the encapsulation film includes the zinc-crosslinked acrylic polymer.

12. The process of claim 10 wherein the encapsulated internal breaker further comprises a water-soluble polymer as a binder.

* * * * *